United States Patent
Singhal et al.

(10) Patent No.: US 11,184,478 B2
(45) Date of Patent: Nov. 23, 2021

(54) SYSTEM AND METHOD FOR MONITORING TELEPHONY COMMUNICATIONS IN REAL TIME

(71) Applicant: EXOTEL TECHCOM PVT. LTD., Bangalore (IN)

(72) Inventors: Sarthak Singhal, New Delhi (IN); Siddharth Ramesh, Bangalore (IN); Govind Rajan M, Trichy (IN)

(73) Assignee: Exotel Techcom Pvt. Ltd., Bangalore (IN)

( * ) Notice: Subject to any disclaimer, the term of this patent is extended or adjusted under 35 U.S.C. 154(b) by 0 days.

(21) Appl. No.: 17/014,198

(22) Filed: Sep. 8, 2020

(65) Prior Publication Data
US 2020/0404095 A1    Dec. 24, 2020

Related U.S. Application Data

(62) Division of application No. 16/381,069, filed on Apr. 11, 2019, now Pat. No. 10,812,651.

(30) Foreign Application Priority Data

Apr. 12, 2018  (IN) ............................ 2018 41013677
Apr. 8, 2019   (IN) ............................ 201841013677

(51) Int. Cl.
*H04M 3/22*       (2006.01)
*H04M 1/7243*     (2021.01)
*H04M 1/72448*    (2021.01)

(52) U.S. Cl.
CPC ....... *H04M 3/2281* (2013.01); *H04M 1/7243* (2021.01); *H04M 1/72448* (2021.01)

(58) Field of Classification Search
CPC .......... H04M 3/2281; H04M 1/72563; H04M 1/72547
See application file for complete search history.

(56) References Cited

U.S. PATENT DOCUMENTS

| | | | | |
|---|---|---|---|---|
| 2006/0073786 A1* | 4/2006 | Sarkar | ................ | H04M 7/0084 455/24 |
| 2013/0165085 A1* | 6/2013 | Krinsky | ................ | H04W 24/08 455/414.1 |
| 2014/0349699 A1* | 11/2014 | Fish | ..................... | H04M 3/5116 455/521 |

* cited by examiner

*Primary Examiner* — Marisol Figueroa

(74) *Attorney, Agent, or Firm* — Grandhi Law Chambers; Krishna Grandhi

(57) ABSTRACT

Exemplary embodiments of the present disclosure are directed towards a system for monitoring telephony communications in real time, comprising: first user communication devices and second user communication devices are connected to a first provider communication device and a second provider communication device. A telephony communication establishment module is installed in the first user communication devices and the second user communication devices, the telephony communication establishment module is configured to perform telephony operations and data connectivity to communicate to a telephony communication monitoring system, and a telephony server is configured to transmit telephony communications to the first user communication devices via a network based on the connection originating to the telephony server, the telephony server is configured to forward the telephony communication status to the first provider communication device, the first provider communication device is configured to provide the telephony communication status from the telephony server to the first user communication devices and the telephony communication monitoring system.

11 Claims, 8 Drawing Sheets

SYSTEM AND METHOD FOR MONITORING TELEPHONY COMMUNICATIONS IN REAL TIME

CROSS-REFERENCE TO RELATED APPLICATIONS

The present application is a divisional application of U.S. patent application Ser. No. 16/381,069, entitled "System and Method for Monitoring Telephony Communications in Real Time", filed on 11 Apr. 2019, which claims priority to and benefit of Indian Provisional Patent Application No: 201841013677, with a priority date of 12 Apr. 2018, and Indian Non-Provisional Patent Application No: 201841013677, with a priority date of 8 Apr. 2019. The entire contents of these patent applications are hereby incorporated by reference herein.

TECHNICAL FIELD

The disclosed subject matter relates generally to the field of telephony systems. More particularly, the present disclosure relates to a system and method for monitoring telephony communications in real time.

BACKGROUND

Telephony systems are currently available to operate and process the telephony communications across operators (e.g., mobile networks) located in different geographical areas and circles. The telephony communications include audio or video telephone calls, Voice telephone calls (PSTN, VoIP, and IP-IP etc.), conferencing telephone calls, unstructured supplementary service data (USSDs), data related operations (using 2G/3G/4G/5G etc.), facsimile transmissions, cloud telephony operations, text messages, SMS messages, MMS messages, video messages, and all other types of telephony and data communications sent by or received by a user. In an instance, once the telephony communication begins, the calling party's telephony device takes an input provided by the user and converts the input into a stream of data packets that are transmitted over a network. If the telephony communication has been placed to another telephony device, those data packets may be delivered to the called telephony device.

One of the problems with managing telephony communications across the operators is monitoring the various factors involved during interaction flows such as—connectivity, telephone call data validation (telephone call status, Dual-tone multi-frequency signaling (DTMF) correctness, etc.), telephone call quality and more. For instance, detecting the telephone call connectivity issue between the operators in a timely and automated manner becomes critical. In addition to detecting telephone call connectivity issues, there are aspects like validating telephone call status information i.e. whether the telephone number is busy, not reachable etc. In an example, operators have interconnects between each other. Such interconnects and telephony infrastructure which supports the operators can have issues due to the point of interconnect congestion or other faults in the network infrastructure. Various possible error scenarios with respect to telephone calls include but not limited to: telephone calls originating from one operator is continuously failing towards another operator, telephone calls originating from one operator is partially failing towards another operator, telephone calls originating from one operator is connecting to another operator but is not able to sustain a connection i.e. getting dropped after a small time interval, telephone calls are unable to originate from a particular network towards one or more operators and telephone calls are not being received by a network from one or more operators.

Currently, it takes a series of manual efforts to identify telephony communication issues wherein such identifications and escalations to happen very late in point of time. With a telephony system that has the potential to make telephony communication attempts between different combinations of operator telephone numbers, identification of telephony communication-related issues will be quick and easy, thereby speeding up escalation and recovery process.

In the light of the aforementioned discussion, there exists a need for a certain system with novel methodologies that would overcome the above-mentioned disadvantages.

SUMMARY

An objective of the present disclosure is directed towards tracking the status of the telephony communications in real time.

Another objective of the present disclosure is directed towards detecting and measuring telephone call quality in real time.

Another objective of the present disclosure is directed towards solving telephony communication aspects across different operators and telephony providers. The telephony communication aspects include issues, for example, a point of interconnection (POI) or other faults in some part of network infrastructure.

Another objective of the present disclosure is directed towards validating the correctness of integrated services digital network (ISDN) cause codes returned by mobile networks for detecting mismatches and data correctness.

Another objective of the present disclosure is directed towards validating the correctness of caller identities (IDs) between a caller and a receiver.

Another objective of the present disclosure is directed towards validating operator tones (e.g., voice message notifying if the telephone number is busy, reachable etc.) between the receiver and the caller.

Another objective of the present disclosure is directed towards validating dual tone multi-frequency (DTMF) tones and identifying mismatches i.e. if the receiver punches the DTMF tones on a telephone call, it is correctly passed on by involved operators and verified by the caller.

Another objective of the present disclosure is directed towards recording the audio stream at receiver and caller ends and measuring for quality.

Another objective of the present disclosure is directed towards detecting and measuring call quality in real-time between different number combinations programmatically and/or by machine learning techniques considering audio parameters like frequency, jitter, distortion, decibel value, signal to noise ratio, anomaly detection and so forth.

Another objective of the present disclosure is directed towards detecting issues with telephony and operator network related issues using a combination of fixed telephony nodes and live telephony nodes.

In an embodiment of the present disclosure, a method comprising a step of initiating the telephony communications from a first user communication device having a first telephone number to a second user communication device having a second telephone number.

In another embodiment of the present disclosure, the method further comprising a step of detecting the telephone communications by a telephony communication establishment module of the second user communication device.

In another embodiment of the present disclosure, the method further comprising a step of matches the telephony communications of the second user communication device having the second telephone number with the information provided by a telephony communication monitoring system.

In another embodiment of the present disclosure, the method further comprising a step of sending a signal to an operating system layer from the telephony communication establishment module to hang up the telephone communications.

In another embodiment of the present disclosure, the method further comprising a step of sending the signal to a telephony communication monitoring system about the telephony communication result from the telephony communication establishment module.

In another embodiment of the present disclosure, the system comprising a plurality of first user communication devices and a plurality of second user communication devices are connected to a first provider communication device and a second provider communication device.

In another embodiment of the present disclosure, the system comprising a telephony communication establishment module is installed in the plurality of first user communication devices and the plurality of second user communication devices.

In another embodiment of the present disclosure, the telephony communication establishment module is configured to perform a plurality of telephony operations and data connectivity to communicate to a telephony communication monitoring system.

In another embodiment of the present disclosure, the telephony communication monitoring system is supported by cloud servers for interactions between the plurality of first user communication devices and the plurality of second user communication devices.

In another embodiment of the present disclosure, the system comprising a telephony server is configured to transmit telephony communications to the plurality of first user communication devices via a network based on the connection originating to the telephony server, the telephony server is configured to forward the telephony communication status to the first provider communication device.

In another embodiment of the present disclosure, the first provider communication device is configured to provide the telephony communication status from the telephony server to the plurality of first user communication devices and the telephony communication monitoring system.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 1 depicts a schematic representation of a system for detecting the telephony communications between communication devices according to an embodiment of the present disclosure.

DETAILED DESCRIPTION OF EXAMPLE EMBODIMENTS

Figure 1:
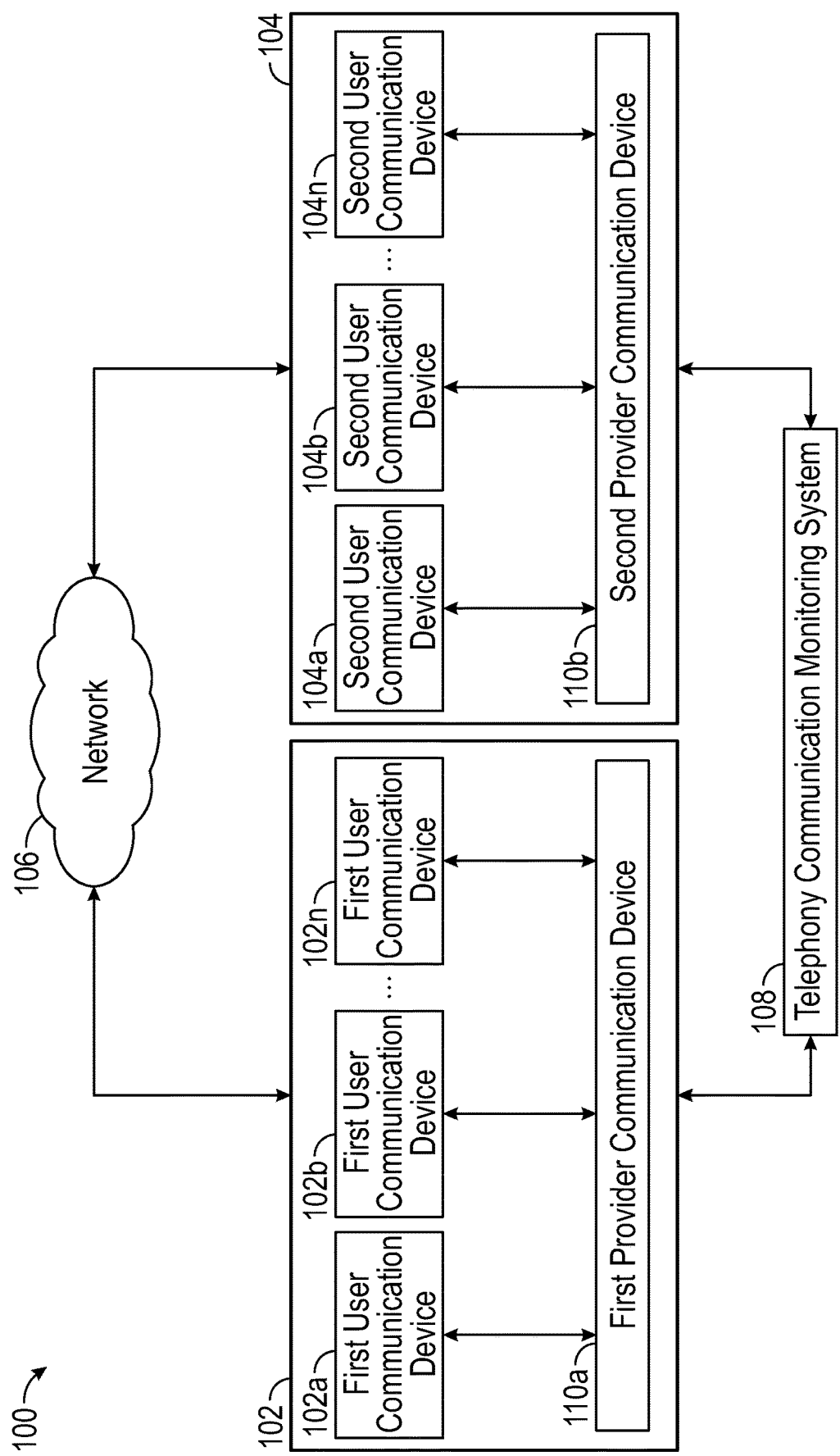
FIG. 1 is a block diagram representing an example environment in which aspects of the present disclosure can be implemented. Specifically.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1, FIG. 1 is a block diagram 100 representing an example environment in which aspects of the present disclosure can be implemented. Specifically, FIG. 1 depicts a schematic representation of the environment for detecting telephony communications between communication devices according to an embodiment of the present disclosure. The example environment is shown containing only representative devices and systems for illustration. The environment 100 may be used as a monitoring system by telephony providers, operators or external entities to keep a real time check on the telephony services. The environment 100 may also be used for on demand testing of telephony services by telephony providers, operators or external entities. The environment 100 may be used to showcase and share real time monitoring data of the telephony operations occurring in a geography. However, realworld environments may contain more or fewer systems or devices. FIG. 1 depicts a first communication platform 102, a second communication platform 104, a network 106, a telephony communication monitoring system 108, and provider communication device 110a-110b. The first communication platform 102 and the second communication platform 104 may comprise first and second user communication devices 102a, 102b . . . 102n, and 104a, 104b . . . 104n, the provider communication device 110a, 110b. The first user communication devices 102a, 102b . . . 102n and the second user communication devices 104a, 104b . . . 104n may be connected to the provider communication device 110a and 110b. The first user communication devices 102a, 102b . . . 102n, and the second user communication devices 104a, 104b . . . 104n and the provider communication device 110a, 110b may comprise a user's communication device, a consumer's communication device, an agent's communication device, a telephone number provider's communication device, an organizer's communication device. The first communication platform 102 and the second communication platform 104 may own different combination of telephone numbers which belong to different mobile operator networks (example, N1, N2 . . . Nn or M1, M2 . . . Mn) or may be standalone first user communication devices 102a, 102b . . . 102n, and second user communication devices 104a, 104b . . . 104n representing a unique telephone number entity.

The first user communication devices 102a, 102b . . . 102n and the second user communication devices 104a, 104b . . . 104n and the provider communication device 110a, 110b may comprise a device such as a personal computer, mobile handsets (e.g., a workstation, an electronic book reader, a personal digital assistant, a mobile station, a mobile phone, a computing tablet, etc.), servers with PRI lines, landlines, analog telephones (e.g., standard telephones and document imaging devices such as facsimile machines), and any device which can potentially trigger a telephony operation such as the telephony communications. Each of the first user communication devices 102a, 102b . . . 102n, and the second user communication devices 104a, 104b . . . 104n may have an interface and application layer communicate and assist the telephony communication monitoring system 108. In case of mobile handsets and the personal computer, a telephony communication establishment module (not shown) may be installed on the handset and the personal computer that'll be responsible for intercepting telephony operations such as telephony communications. The telephony communication establishment module (not shown) may be accessed as mobile applications, web applications, software that offers the functionality of accessing mobile applications, and viewing/processing of interactive pages, for example, are implemented in the first user communication devices 102a, 102b . . . 102n, and second user communication devices 104a, 104b . . . 104n as will be apparent to one skilled in the relevant arts by reading the disclosure provided herein. The telephony communication establishment module (not shown) may have a capability to communicate to the first user communication devices 102a, 102b . . . 102n and the second user communication devices 104a, 104b . . . 104n for telephony operations and data connectivity to communicate to the telephony communication monitoring system 108. The telephony communication establishment module (not shown) may keep running in the background to listen to instructions from the telephony communication monitoring system 108 and may have permissions for manipulating the telephony communications. The telephony communication monitoring system 108 may be supported by cloud servers for interactions between the first user communication devices 102a, 102b . . . 102n, and the second user communication devices 104a, 104b . . . 104n. The first communication platform 102 and the second communication platform 104 may have an interface to the telephony communication monitoring system 108 for receiving the instructions. As per the instructions, the first user communication devices 102a, 102b . . . 102n, and the second user communication devices 104a, 104b . . . 104n may initiate telephony communications among itself, other telephony provider telephone numbers, standalone telephone numbers or basically any communication devices in the network 106 required for handling the instructions. The first user communication devices 102a, 102b . . . 102n may be configured to trigger the telephony communications towards the second user communication devices 104a, 104b . . . 104n through the network 106.

The network 106 may include, but is not limited to, an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a publicly switched telephone network (PSTN), or a cellular telephony network, a private branch exchange layer (PBX), a public switched telephone network (PSTN), public internet, private internet, fiber cables, cell towers, and the like. The network 106 may provide a web interface employing transmission control protocol, hypertext transfer protocol, simple object access protocol or any other internet communication protocol. The first user communication devices 102a, 102b . . . 102n, and the second user communication devices 104a, 104b . . . 104n may be connected to the network 106 via gateways (not shown). The gateways (not shown) may allow users and devices that are connected to the network 106 to connect with users and devices that are reachable through the first user communication devices 102a, 102b . . . 102n, and the second user communication devices 104a, 104b . . . 104n, and vice versa. In some instances, the gateway (not shown) may be a part of the first user communication device 102a, 102b . . . 102n, and the second user communication devices 104a, 104b . . . 104n. In other instances, the gateway (not shown) may be maintained by a third party.

Figure 2A:
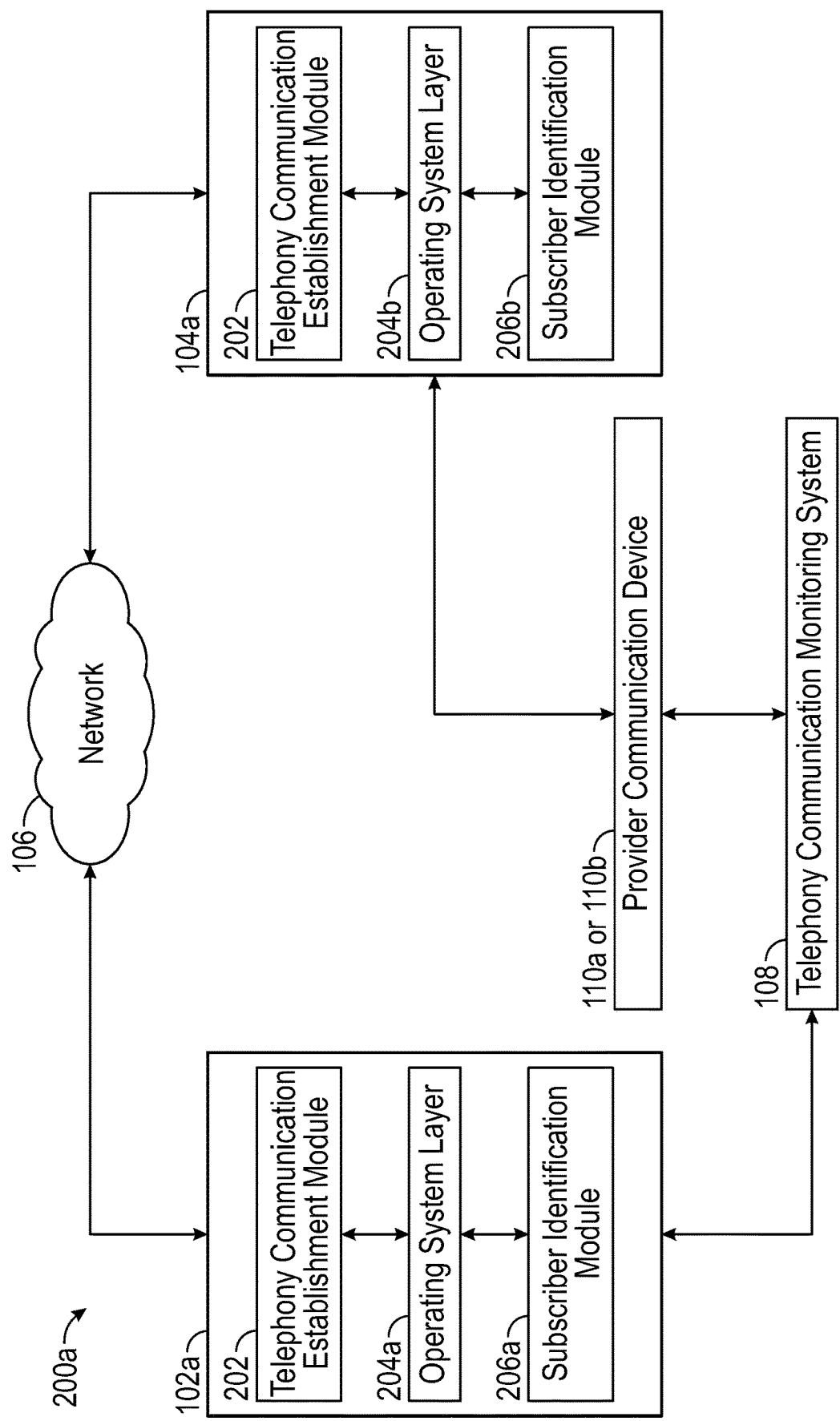
FIG. 2A is a diagram depicting an exemplary embodiment of connectivity testing scenario between the communication devices and the provider communication device, in accordance with one or more exemplary embodiments.

Referring to FIG. 2A, FIG. 2A is a diagram depicting an exemplary embodiment of connectivity testing scenario between the first user communication devices 102a, 104a, and the provider communication device 110a or 110b, in accordance with one or more exemplary embodiments. The example diagram 200a may depict the first user communication devices 102a and the second user computing device 104a, the provider communication device 110a or 110b, the network 106, and the telephony communication monitoring system 108. The connectivity test is performed to test connectivity between the first user and second user communication devices 102a, 104a, and the provider communication device 110a or 110b. The provider communication device 110a or 110b may also be referred to as the communication devices. The first user communication device 102a and the second user communication device 104a may comprise the telephony communication establishment module 202, an operating system layer 204a-204b, and a subscriber identification module 206a-206b. The first user communication device 102a and the second user communication device 104a may be single or multiple depending on a telephony operation to be tested. The telephony operation may include but is not limited to, telephone call connectivity, telephone call quality, telephone call status correctness, DTMF correctness, and the like. In case of connectivity, only two first user and second user communication devices 102a and 104a may be needed whereas, in case of conferencing multiple user communication devices 102a, 102b . . . 102n, and 104a, 104b . . . 104n may be needed.

The telephony communication establishment module 202 may listen to silent push notifications or pings from the telephony communication monitoring system 108 and respond with acknowledgments. The telephony communication establishment module 202 may be configured to keep listing to telephony operations within the first user communication devices 102a, 102b . . . 102n and the second user communication devices 104a, 104b . . . 104n and intercept the telephone call if it matches with telephone number N and perform hang up by communicating with the operating system layer 204a and 204b which in turn may signal the subscriber identification module 206a or 206b and the network to 106 to cut the telephone call. The telephony communication establishment module 202 may also be configured trigger a telephone call towards the first user communication device 102a or the second user communication device 104a having the telephone number N1 or M1 and then respond back to the telephony communication monitoring system 108 with data once the telephone call is terminated. The telephony communication establishment module 202 may also be configured to trigger a telephone call towards the first user communication device 102a or the second user communication device 104a having the telephone number N1 and then play an audio stream before hanging up and respond back to the telephony communication monitoring system 108. The telephony communication establishment module 202 may further be configured to trigger the telephone call towards the first user communication device 102a or the second user communication device 104a having the telephone number N1 with predefined DTMF attached during dial or it'll punch after pick up and then respond back to the telephony communication monitoring system 108.

Figure 2B:
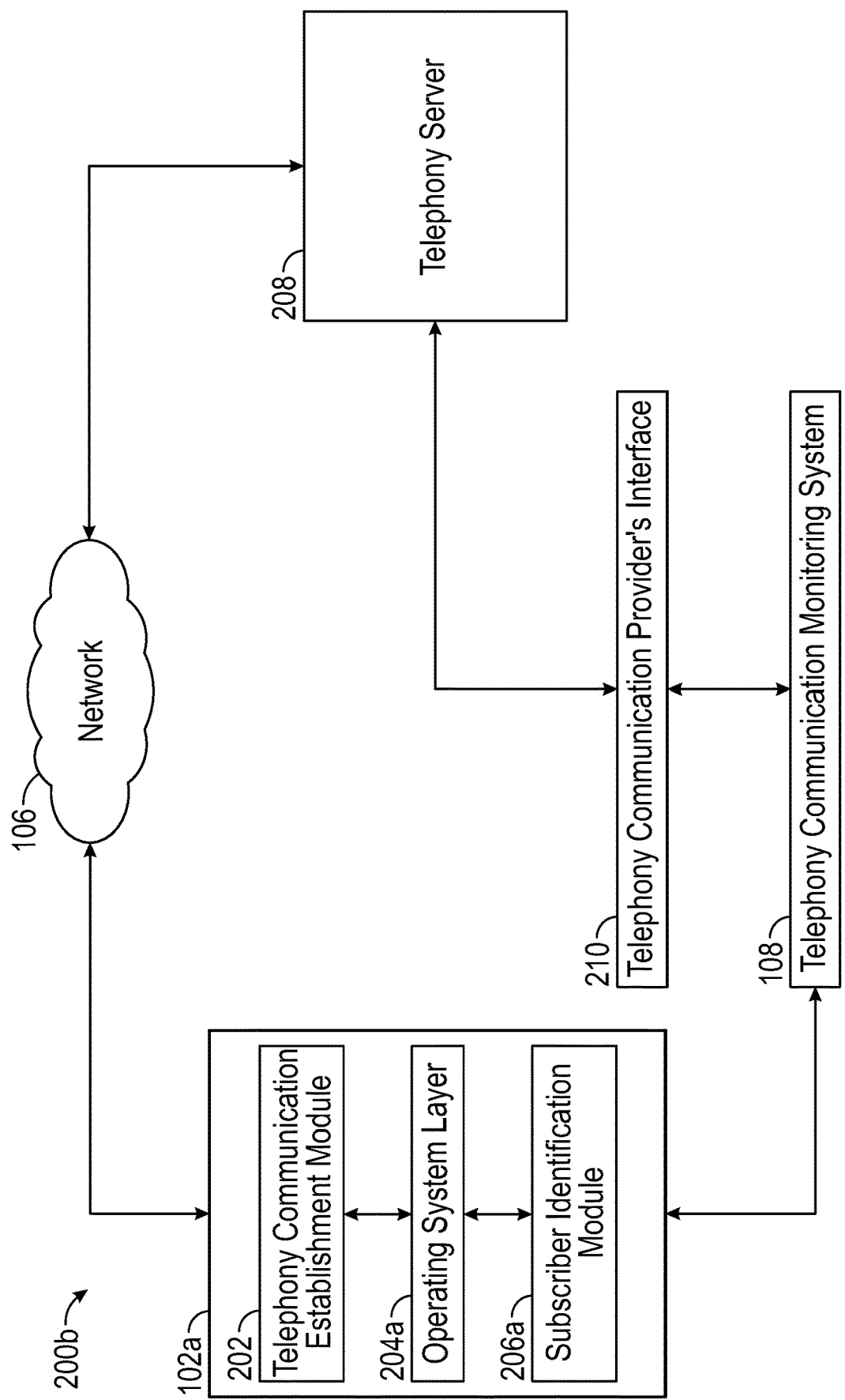
FIG. 2B is a diagram depicting an exemplary embodiment of a connectivity testing scenario between the first user communication device and a telephony server, in accordance with one or more exemplary embodiments.

Referring to FIG. 2B, FIG. 2B is a diagram 200b depicting an exemplary embodiment of a connectivity testing scenario between the first user communication device 102a and a telephony server 208, in accordance with one or more exemplary embodiments. The example diagram 200b may depict the first user communication device 102a, the telephony server 208 or it may be a telephony device with a PRI line or any telephony supporting communication device, the telephony communication provider's interface 210, the network 106, and the telephony communication monitoring system 108. The connectivity test may be performed to test connectivity between the first user communication device 102a and the telephony server 208 and/or the telephony communication provider's interface 210. The telephony server 208 may include the telephony server with PRI line. The first user communication device 102a may comprise the telephony communication establishment module 202, an operating system layer 204a, and a subscriber identification module 206a. The first user communication device 102a may be single or multiple depending on a telephony operation to be tested. The telephony operation may include but is not limited to, telephone call connectivity, telephone call quality, telephone call status correctness, DTMF correctness, and so forth. In case of connectivity, only two communication devices 102a and 104a may be needed whereas in case of conferencing multiple first user communication devices 102a, 102b . . . 102n and the second user communication devices 104a, 104b . . . 104n may be needed.

The telephony communication monitoring system 108 may be configured to control and issue the instructions to the first user communication devices 102a, 102b . . . 102n, and the second user communication devices 104a, 104b . . . 104n and serve as a central layer. The telephony communication monitoring system 108 may be configured to provide the instruction for telephony communications expectation to the first user communication device 102a from the second user communication device 104a or the telephony server 208 via the network 106. The first user communication device 102a may be configured to acknowledge the instruction via the telephony communication monitoring system 108. The telephony communication monitoring system 108 may be configured to provide the instruction for triggering telephony communications to the first user communication device 102a from the second user communication device 104a or the telephony server 208 via the network 106 to the provider communication device 110a or 110b or the telephony communication provider's interface 210. The provider communication device 110a or 110b or the telephony communication provider's interface 210 may be configured to acknowledge the telephony communication and return the telephony communication status to the telephony communication monitoring system 108.

The provider communication device 110a or 110b or the telephony communication provider's interface 210 may be configured to forward the telephony communication request to the second user communication device 104a or the telephony server 208. The second user communication device 104a or the telephony server 208 may be configured to transmit the telephony communication request to the first user communication device 102a via the network 106. The telephony communications may or may not be transmitted to the first user communication device 102a via the network 106 from the second user communication device 104a or the telephony server 208 based on the connection originating to the second user communication device 104a or the telephony server 208 from the first user communication device 102a.

The telephony server 208 or the second user communication device 104a may be configured to forward the telephony communication failure status to the provider communication device 110a or 110b. The provider communication device 110a or 110b or the telephony communication provider's interface 210 may be configured to provide the telephony communications failure from the second user communication device 104a or the telephony server 208 to the first user communication device 102a to the telephony communication monitoring system 108.

Figure 3:
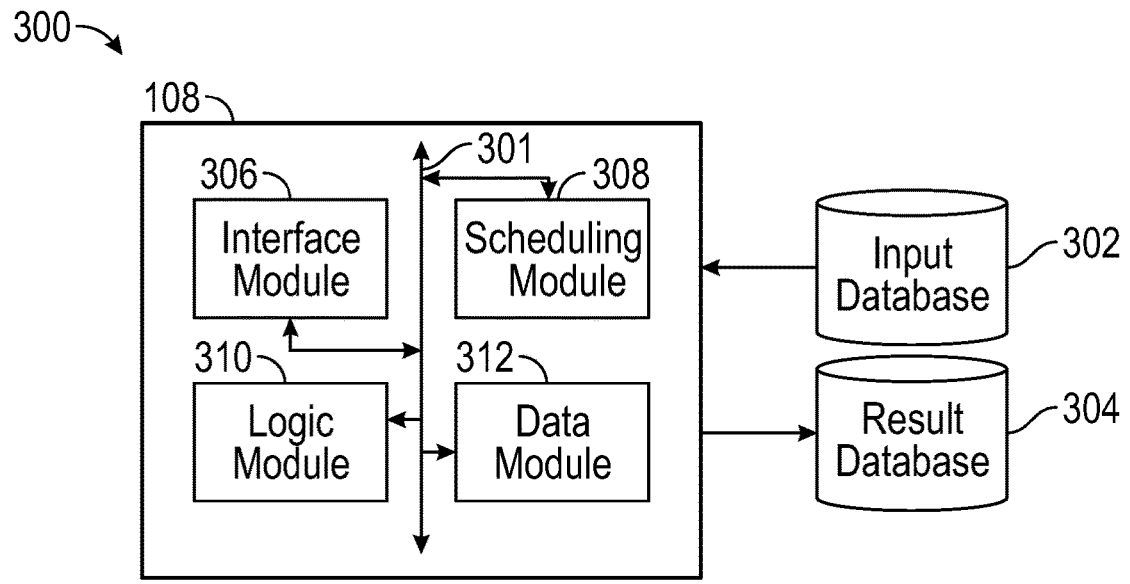
FIG. 3 is a block diagram depicting an exemplary embodiment of the connection between the telephony communication monitoring system and the databases, in accordance with one or more exemplary embodiments.

Referring to FIG. 3, FIG. 3 is a block diagram 300 depicting an exemplary embodiment of the connection between the telephony communication monitoring system 108 and the databases, in accordance with one or more exemplary embodiments. The block diagram 300 may depict the telephony communication monitoring system 108, an input database 302, and a result database 304. The communication monitoring system 108 may comprise a bus 301, an interface module 306, a scheduling module 308, a logic module 310, and a data module 312. The bus 301 may include a path that permits communication among the modules of the telephony communication monitoring system 108. The input database 302 may be fed to the telephone communication monitoring system 108. The input database 302 may include but is not limited to, available telephone numbers and instruction data, available communication devices, metadata about operators or telephone numbers, previous tests results, and so forth. The scheduling module 308 may be configured to schedule a telephony operation satisfying a unique combination of the operator (s) and telephone number (s) and send instructions to the provider communication device 110a or 110b.

The available telephone numbers may comprise a list of telephone numbers available for the telephony communication monitoring system 108 to issue telephony operations (e.g., outgoing telephone calls, incoming telephone calls, etc.). The available telephone numbers may belong to a multitude of varying mobile networks across different geographies, generally mapping to a unique operator identifier called MCC-MNC (mobile country code-mobile network code). The available first user communication devices 102a, 102b ... 102n, and the second user communication devices 104a, 104b ... 104n may comprise a list of communication devices, each of which may be associated with an available telephone number along with the communication properties. The communication properties may include but are not limited to, telephone call volume, signal strength trends, priority factor, failure rates, connectivity rating, telephone call quality, status correctness value, and so forth. The test results may comprise results of previous telephony operations carried out by the telephony communication monitoring system 108 inferring to the communication properties. Apart from scheduling task, the telephony communication monitoring system 108 for any combination or operation may also be triggered based on independent requests which may through application programming interface (API's) requests, ad hoc requests, and so forth.

Once the telephony communication monitoring system 108 receives the request for the telephony operations, the telephony communication monitoring system 108 may invoke the involved first user communication devices 102a, 102b ... 102n and the second user communication devices 104a, 104b ... 104n depending on the operation using a set of instructions. For instance, to test a telephone call, from the communication device 104a (belonging to operator foo, telephone number M1) towards the first user communication device 102a (belonging to operator bar, telephone number N1), the telephony communication monitoring system 108 may be configured to send an instruction to the first user communication device 102a about an incoming telephone call and wait for the acknowledgment. Once the acknowledgment is received, it may be processed by triggering the telephone call. If acknowledge signal is not received within expiry time or is rejected, it may move to the next available task and retry later once the communication devices 102a, 104a become active or available. The signaling may help the first user communication devices 102a and the second user communication device 104a to identify that an incoming telephone call from the telephony communication monitoring system 108 is expected and its telephony communication establishment module 202 may perform necessary steps accordingly once it receives the telephone call. Alternatively, remove the interaction and directly trigger the telephony operation i.e., the telephone call from the communication device 104a towards the first user communication device 102a. The first user communication devices 102a, 102b ... 102n and the second user communication devices 104a, 104b ... 104n may use a local database which regularly syncs up with the telephony communication monitoring system 108 containing a list of monitoring telephone numbers which may be used by the first user communication device 102a, and the second user communication device 104a to detect if it's a monitoring telephone calls.

Some example of different possible instructions which the telephony communication monitoring system 108 may trigger along with expected response: a. Are you alive: To verify if the telephone number is active and may communicate to the telephony communication monitoring system 108. The telephony communication monitoring system 108 may be configured to intercept the telephone call from the first user communication device 102a or the second user communication device 104a having the telephone number N or M and hang up. The telephony communication monitoring system 108 may be configured to trigger telephone call towards the first user communication device 102a having the telephone number N1 or M1 from the communication device having the telephone number M1 or N1 and then
  i. Wait for hang up or telephone call termination
  ii. Wait for pick up->play audio->hang up
  iii. Wait for pick up->punch DTMF->hang up The telephony communication monitoring system 108 may be configured to intercept telephone call from the first user communication device 102a or the second user communication device 104a having the telephone number N or M to pick up and wait for hang up. The telephony communication monitoring system 108 may be configured to intercept telephone call from the first user communication device 102a or the second user communication device 104a having the telephone number N or M and don't pick up till hanging up. Switch off the communication device having the telephone number for a few minutes (e.g., x minutes) for telephone call status testing.

Each of the instructions may have an expiry time and sequence logic may be decided by the telephony communication monitoring system 108. On receiving the instructions, the first user communication device 102a and the second user communication device 104a may acknowledge the instructions and provide result dataset to the result database 304 based on the instructions to the telephony communication monitoring system 108.

Triggering of telephony operations: the telephony communication monitoring system 108 may be configured to trigger the telephony operations among the first user communication device 102a, and the second user communication device 104a based on the instruction set. The telephony communication monitoring system 108 may be configured to invoke the telephony communication establishment module 202 of the second user communication device 104a to trigger the monitoring telephone call towards the first user communication device 102a i.e., the outgoing telephone call for the second user communication device 104a and the incoming telephone call for the first user communication device 102a. The telephony communication establishment module 202 of the second user communication device 104a may be configured to respond back with the acknowledgment signal denoting whether the telephony operation is triggered, rejected, and successful, etc. The second user communication device 104a may also be configured to keep updating regarding the progress and termination of telephone call operation i.e., if the telephone call is initiated, in-progress, ringing, cancelled, completed, busy, failed, etc. if origination of monitoring telephone call from the second user communication device 104a fails, the telephony communication monitoring system 108 may be configured to notify the first user communication device 102a about such origination failure and the first user communication device 102a may not expect a telephone call from the telephony communication monitoring system 108 anymore.

An outgoing telephone call for the communication device 104a: internally once the second user communication device 104a receives a monitoring telephone call request towards the first user communication device 102a, the second user communication device 104a initiates the outgoing telephone call from associated operator-telephone number to be tested as instructed by the telephony communication monitoring system 108.

An incoming telephone call for the first user communication device 102a: from the moment telephony communication monitoring system 108 triggers the telephone call towards the first user communication device 102a, it may pass through the network 106. Once the telephone call successfully passes through the network 106, the incoming telephone call may receive to the first user communication device 102a. Once the incoming telephone call arrives on the first user communication device 102a, the telephony communication establishment module 202 may intercept the telephone call and verify with the previously received signal to identify it is a monitoring telephone call or not. On identification, the first user communication device 102a may perform the action as instructed by the telephony communication monitoring system 108 towards the incoming telephone call i.e., to hang up, pick up or perform other operations. The first user communication device 102a may pass the result of the action and telephone call data to the telephony communication monitoring system 108. In this case, assuming that the communication management system 108 may be signaled the first user communication device 102a to hang up the telephone call and pass result. The telephony communication establishment module 202 of the first user communication device 102a, on receiving the telephone call from the second user communication device 104a, may initiate the hang up instructing the subscriber identification module 206a and thereby the provider communication device 110a associated with the first user communication device 102a to hang up the telephone call. The behavior of the telephony communication establishment module 202 on certain instructions:

| Instructions | Telephony Communication Establishment Module 202 behavior |
|---|---|
| Are you alive: To verify if the communication device having the telephone number is active and can communicate to telephony communication monitoring system 108. | The telephony communication establishment module 202 may listen to silent push notifications or pings from the telephony communication monitoring system 108 and respond with acknowledgments |
| Intercept the telephone call from the communication device having the telephone number N and hang up | The telephony communication establishment Module 202 may keep listing to all telephone call events within the communication device and intercept the telephone call if it matches with telephone number N and perform hang up by communicating with the communication device's operating system layer which in turn may signal the subscriber identification module 206a or 206b and network to cut the telephone call |
| Trigger the telephone call towards the first user communication device 102a having the telephone number N1 from the communication device having the telephone number M1 and then wait for hang up or telephone call termination | The telephony communication establishment module 202 may trigger a telephone call towards the communication device 102a having the telephone number N1 and then respond back to the telephony communication monitoring system 108 with data once telephone call is terminated. |

-continued

| Instructions | Telephony Communication Establishment Module 202 behavior |
|---|---|
| Trigger the telephone call towards the first user communication device 102a having the telephone number N1 from the communication device 104a having the telephone number M1 and then wait for pick up -> play audio -> hang up | The telephony communication establishment module 202 may trigger a telephone call towards the communication device having the telephone number N1 and then play an audio stream before hanging up and respond back to the telephony communication monitoring system 108. |
| Trigger the telephone call towards the communication device having the telephone number N1 from the communication device having the telephone number M1 and then wait for pick up -> punch DTMF -> hang up | The telephony communication establishment module 202 may trigger a telephone call towards the communication device having the telephone number N1 with predefined DTMF attached during dial or it'll punch after pick up and then respond back to the telephony communication monitoring system. |

The first user communication devices 102a, 102b . . . 102n and the second user communication devices 104a, 104b . . . 104n may hide the monitoring telephone call details from the user's telephone call log by deleting such records as soon as it identifies it as a monitoring telephone call.

Termination and result of telephony operations: on successful hang up, the first user communication device 102a may pass the result with telephone call data to the telephony communication monitoring system 108, in this case marking it as 'success' that a telephone call may be indeed received from the first user communication device 102a as expected. Post hang up by the first user communication device 102a, the signal may be relayed to the second user communication device 104a as well about the hang up through the network 106 and it may thereby inform the telephony communication monitoring system 108 that operation is complete and the telephone call status marked as hang up from the first user communication device 102a. The logic module 310 may be configured to combine the results and data from the first user communication device 102a and the second user communication device 104a, marking the connectivity and data correction as successful. The result may be saved in the result database 304 for further scheduling, reference, and actions. For connectivity monitoring user-case of the telephony communication monitoring system 108, it may capture results data in pair's operator combinations using a matrix (e.g., M×N matrix) where columns may represent all originating operators and rows may represent all receiving operator.

Each of the cells in an M×N matrix may be a unique combination of operators across geographies (who can be usually represented uniquely using MCC-MNC code), an entry in each cell may represent the connectivity at any instance of time (UP/DOWN). Similarly, each individual cell may also contain details for other telephony operations and results like telephone call quality measurement, connectivity strength, percentage failure rate, telephone call properties correctness etc. Similarly, data may be captured in any other form as well. The scheduling module 308 may be configured to consider various parameters and decide which telephony operation to perform. The first user communication devices 102a or 104a may be configured to consider the operator combination using the parameters. The parameters may include but are not limited to, telephone call volume between operators, prioritization order, the freshness of old result, and previous test results if tests recently failed or passed. The data module 312 may include databases of functional features. The telephony communication monitoring system 108 may be configured to receive the input information from the scheduling module 308 or the interface module 306 (e.g., ad hoc requests, API requests, etc.) to test the telephony operations, in this case, the telephone call between two operators for connectivity measurement. The scheduling module 308 may schedule different telephony operations as well as different measurements apart from the connectivity. For an instance, the communication device having the outgoing telephone number to be 011XXX (e.g., a first telephony communication provider) and the communication device having the incoming telephone number to be 0992XXX (e.g., a second telephony communication provider). The telephony communication monitoring system 108 may identify which entity owns the telephone numbers and initiate invocation towards the entity. The telephone number 0992XXX belongs to the second telephony communication provider which telephony communication monitoring system 108 identifies to be owned by the user and the telephone number 011XXX belongs to the telephony communication monitoring system 108. The telephony communication monitoring system 108 may ping the telephone number 0992XXX to the communication device to check its availability and also inform the monitoring telephone call to the communication device from the telephone number 011XXX within an expiry time. The telephony communication monitoring system 108 may initiate a request to the outgoing telephone number 011XXX for triggering the monitoring telephone call towards the telephone number 0992XXX. On successful acknowledgment, the telephone number 011XXX telephone call may be propagated through various channels and receive to the communication device belonging to the telephone number 0992XXX. On failure case, the telephony communication monitoring system 108 owning the telephone number 011XXX acknowledges back that telephone call is failed to mention reason for telephone call failure status which is recorded by the telephony communication monitoring system 108. On the successful case, once the incoming telephone calls are received to the communication device having the telephone number 0992XXX, the telephony communication establishment module 202 intercepts the telephone call and matches it with the information provided by the telephony communication monitoring system 108. On successful identification by the communication device having the telephone number 0992XXX as the monitoring telephone call from the communication device having the telephone number 011XXX, the telephony communication establishment module 202 performs the hangs up action in the background as per instructions from the telephony communication monitoring system 108.

On successful hang up, the communication device informs the telephony communication monitoring system 108 that it indeed receives a telephone call from the communication device having the telephone number 011XXX and provide details on the telephone call data. At the around same time, the communication device owning the telephone number 011XXX also informs the telephony communication monitoring system 108 of completing the telephone call towards the computing device having the telephone number 0992XXX along with telephone call data. The telephony communication monitoring system 108 may be configured to record such results in the database and repeat testing of other combinations of operators or other telephony operations. Similarly, the outgoing telephone number may belong to the communication device and the incoming telephone number may belong to another communication device.

Figure 4:
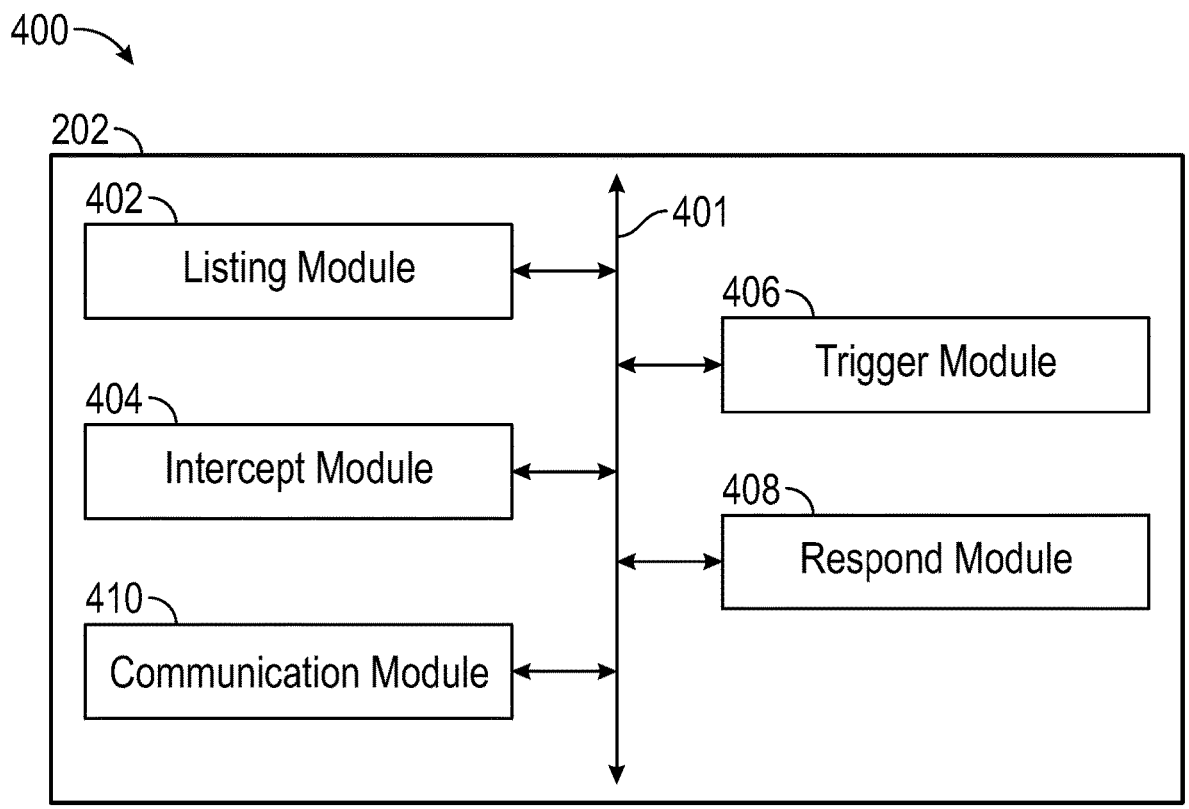
FIG. 4 is a block diagram depicting the telephone communication establishment module, in accordance with one or more exemplary embodiments.

Referring to FIG. 4, FIG. 4 is a block diagram 400 depicting the telephone communication establishment module 202, in accordance with one or more exemplary embodiments. The telephone communication establishment module 202 may comprise a bus 401, a listing module 402, an intercept module 404, a trigger module 406, a respond module 408, and a communication module 410. The bus 401 may include a path that permits communication among the modules of the telephony communication establishment module 110. The term "module" is used broadly herein and refers generally to a program resident in the memory of the first user communication device 102a or second user communication device 104a.

The listing module 402 may be configured to list the telephony operations within the first user communication device 102a or second user communication device 104a and the intercept module 404 may be configured to intercept the telephony operations if it matches with the telephone number and perform hang up by communicating with the operating system module 204a or 204b which in turn may signal the subscriber identification module 206a or 206b and the network 106 to cut the telephony operations. The triggering module 406 may be configured to trigger the telephony operation towards the first user communication device 102a or second user communication device 104a having the telephone number and then the respond module 408 may be configured to respond back to the telephone communication monitoring system 108 with data once the telephony operation is terminated. The communication module 410 may be configured to establish the communication with the first user or second user communication device 102a or 104a and/or the telephony communication monitoring system 108.

Figure 5:
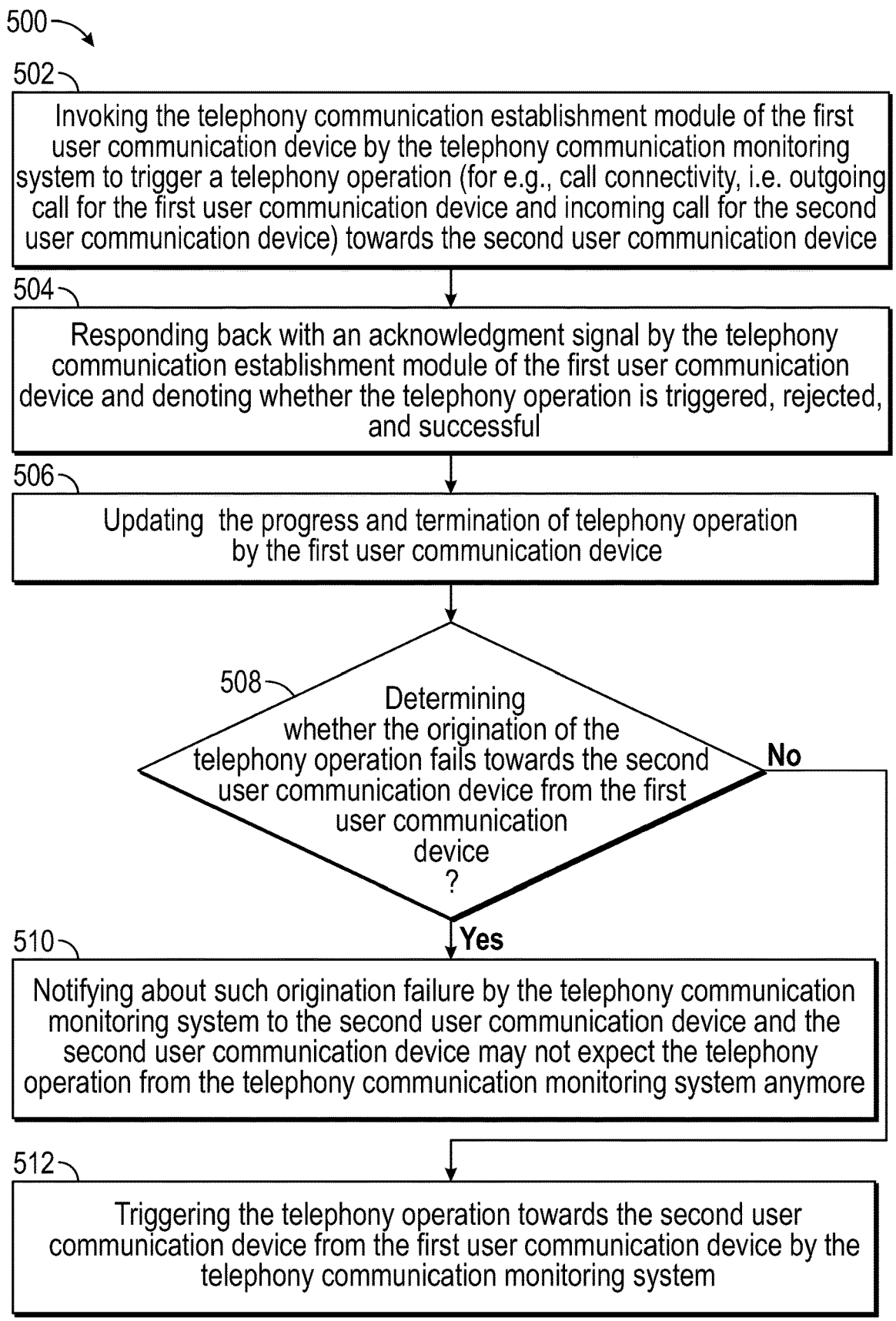
FIG. 5 is an example flow diagram depicting a method for triggering telephony operation towards the second user communication devices, in one or more exemplary embodiments.

Referring to FIG. 5, FIG. 5 is an example flow diagram 500 depicting a method of triggering telephony operation towards the second user communication devices, in one or more exemplary embodiments. The method 500 may be carried out in the context of the details of FIG. 1, FIG. 2, FIG. 3, and FIG. 4. However, the method 500 may also be carried out in any desired environment. Further, the aforementioned definitions may equally apply to the description below.

The method commences at step 502, invoking the telephony communication establishment module of the first user communication device by the telephony communication monitoring system to trigger a telephony operation (for e.g., call connectivity, i.e. outgoing call for the first user communication device and incoming call for the second user communication device) towards the second user communication device. Thereafter, at step 504, responding back with an acknowledgment signal by the telephony communication establishment module of the first user communication device and denoting whether the telephony operation is triggered, rejected, and successful. Thereafter, at step 506, updating the progress and termination of telephony operation by the first user communication device. Thereafter, at step 508, determining whether the origination of the telephony operation fails towards the second user communication device from the first user communication device? If the answer to step 508 is YES, then the method continues at step 510, notifying about such origination failure by the telephony communication monitoring system to the second user communication device and the second user communication device may not expect the telephony operation from the telephony communication monitoring system anymore. If the answer to step 508 is NO, then the method continues at step 512, triggering the telephony operation towards the second user communication device from the first user communication device by the telephony communication monitoring system.

Figure 6:
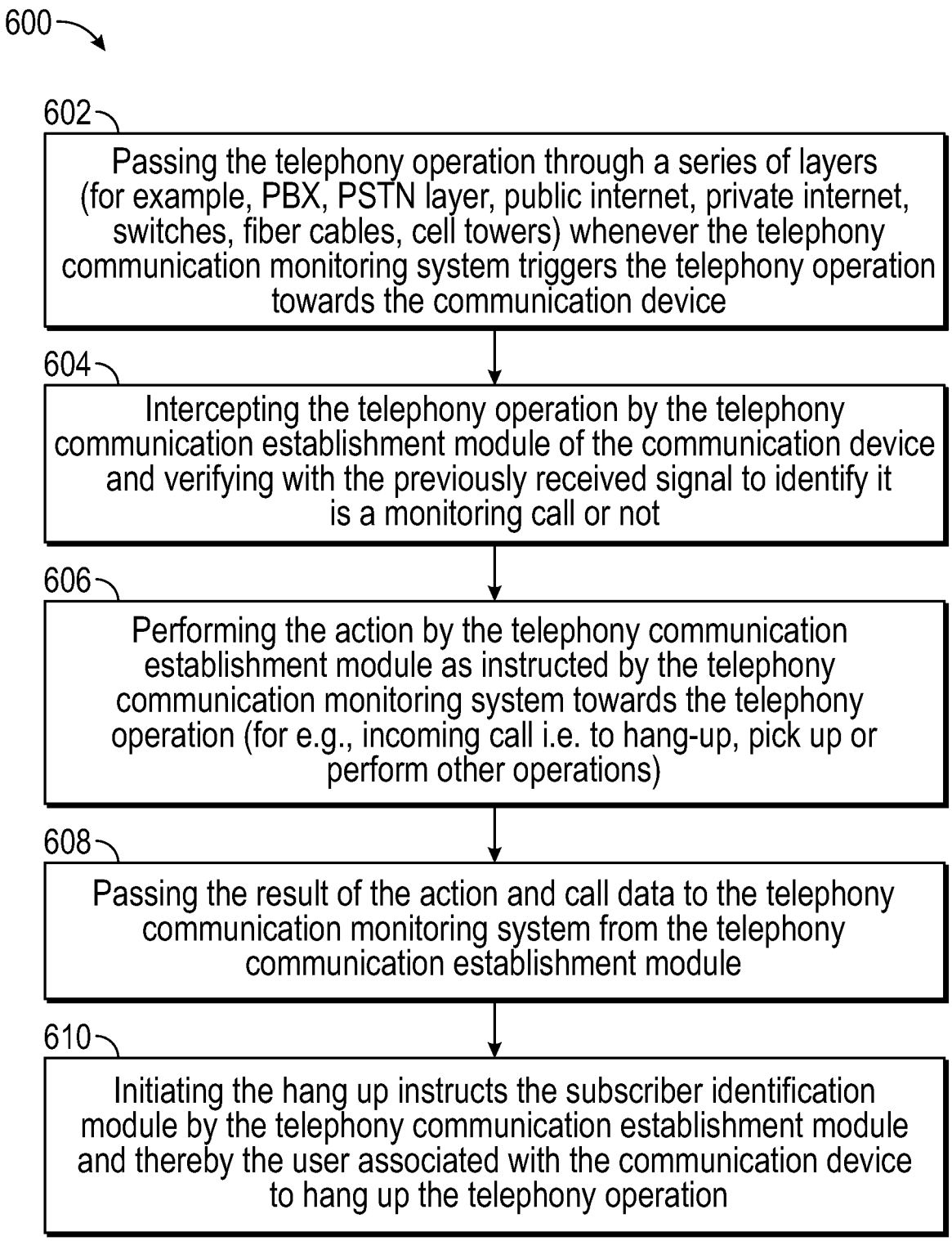
FIG. 6 is an example flow diagram depicting a method for hanging up the telephony operation, in one or more exemplary embodiments.

Referring to FIG. 6, FIG. 6 is an example flow diagram 600 depicting a method for hanging up the telephony operation, in one or more exemplary embodiments. The method 600 may be carried out in the context of the details of FIG. 1, FIG. 2, FIG. 3, and FIG. 4. However, the method 500 may also be carried out in any desired environment. Further, the aforementioned definitions may equally apply to the description below.

At step 602, passing the telephony operation through a series of layers (for example, PBX, PSTN layer, a public internet, a private internet, switches, fiber cables, cell towers) whenever the telephony communication monitoring system triggers the telephony operation towards the communication device. Thereafter, at step 604, intercepting the telephony operation by the telephony communication establishment module of the communication device and verifying with the previously received signal to identify it is a monitoring call or not. Thereafter, at step 606, performing the action by the telephony communication establishment module as instructed by the telephony communication monitoring system towards the telephony operation (for e.g., incoming call i.e. to hang-up, pick up or perform other operations). Thereafter, at step 608, passing the result of the action and call data to the telephony communication monitoring system from the telephony communication establishment module. Thereafter, at step 610, initiating the hang up instructs the subscriber identification module by the telephony communication establishment module and thereby the user associated with the communication device to hang up the telephony operation.

Figure 7:
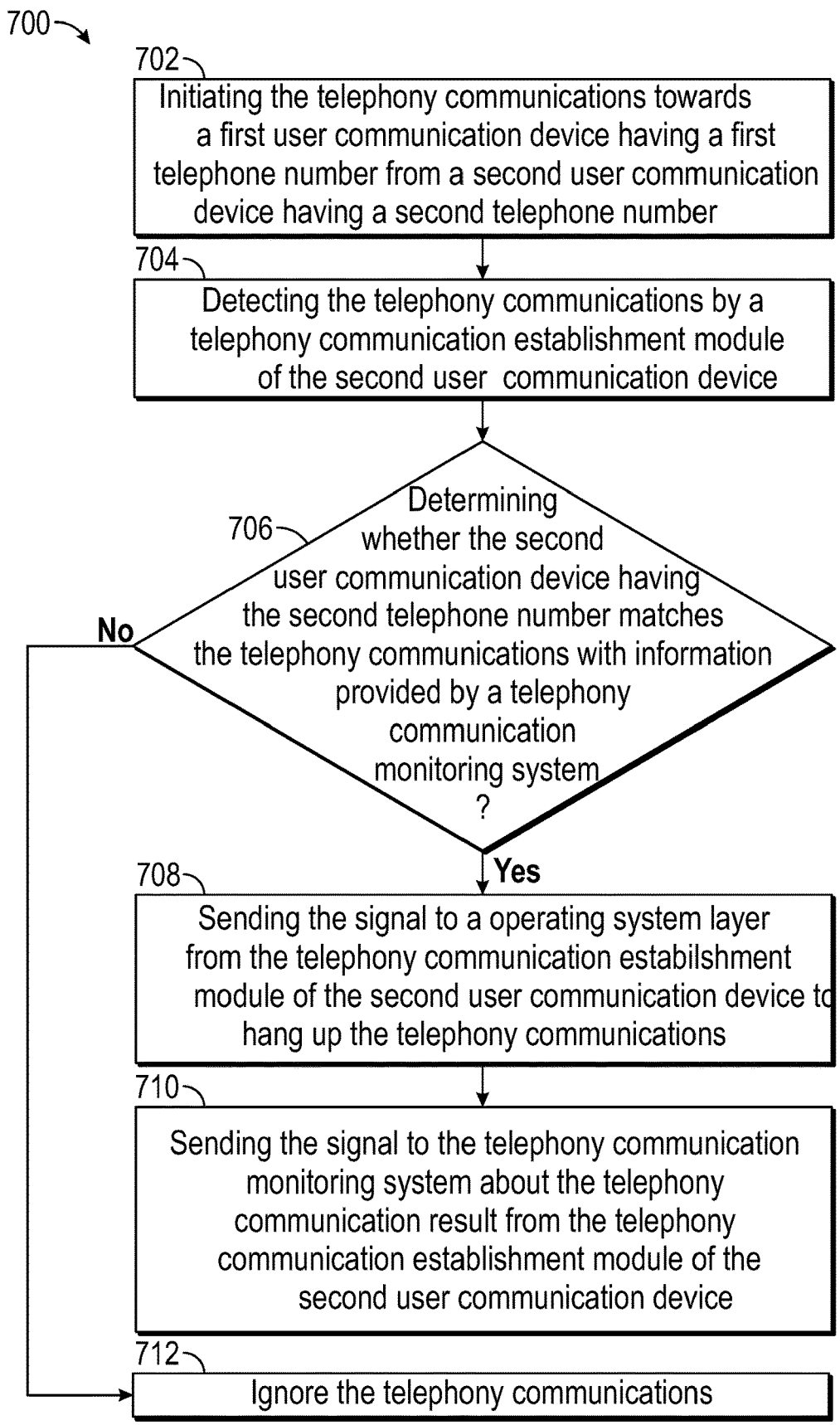
FIG. 7 is an example flow diagram depicting a method for connectivity use-case between the communication devices, in one or more exemplary embodiments.

Referring to FIG. 7, FIG. 7 is an example flow diagram 700 depicting a method for connectivity use-case between the communication devices, in one or more exemplary embodiments. The method 700 may be carried out in the context of the details of FIG. 1, FIG. 2, FIG. 3, and FIG. 4, FIG. 5, FIG. 6. However, the method 700 may also be carried out in any desired environment. Further, the aforementioned definitions may equally apply to the description below.

The method commences at step 702, initiating the telephony communications towards the first user communication device having the first telephone number from the second user communication device having the second telephone number. Here, the first telephone number and the second telephone number may or may not be belonged to the same telephone network. Thereafter, at step 704, detecting the telephony communications by the telephony communication establishment module of the second user communication device. Thereafter, at step 706, determining whether the second user communication device having the second telephone number matches the telephony communications with the information provided by the telephony communication monitoring system. Here, the telephony communication monitoring system identifies the telephone number and provide information about it. If the answer to step 706 is a YES, then at step 708, sending the signal to the operating system layer from the telephony communication establishment module of the second user communication device to hang up the telephony communications. Thereafter, at step 710, sending the signal to the telephony communication monitoring system about the telephony communication result from the telephony communication establishment module of the second user communication device. If the answer to step 706 is a NO, then at step 712, ignore the telephony communications.

Figure 8:
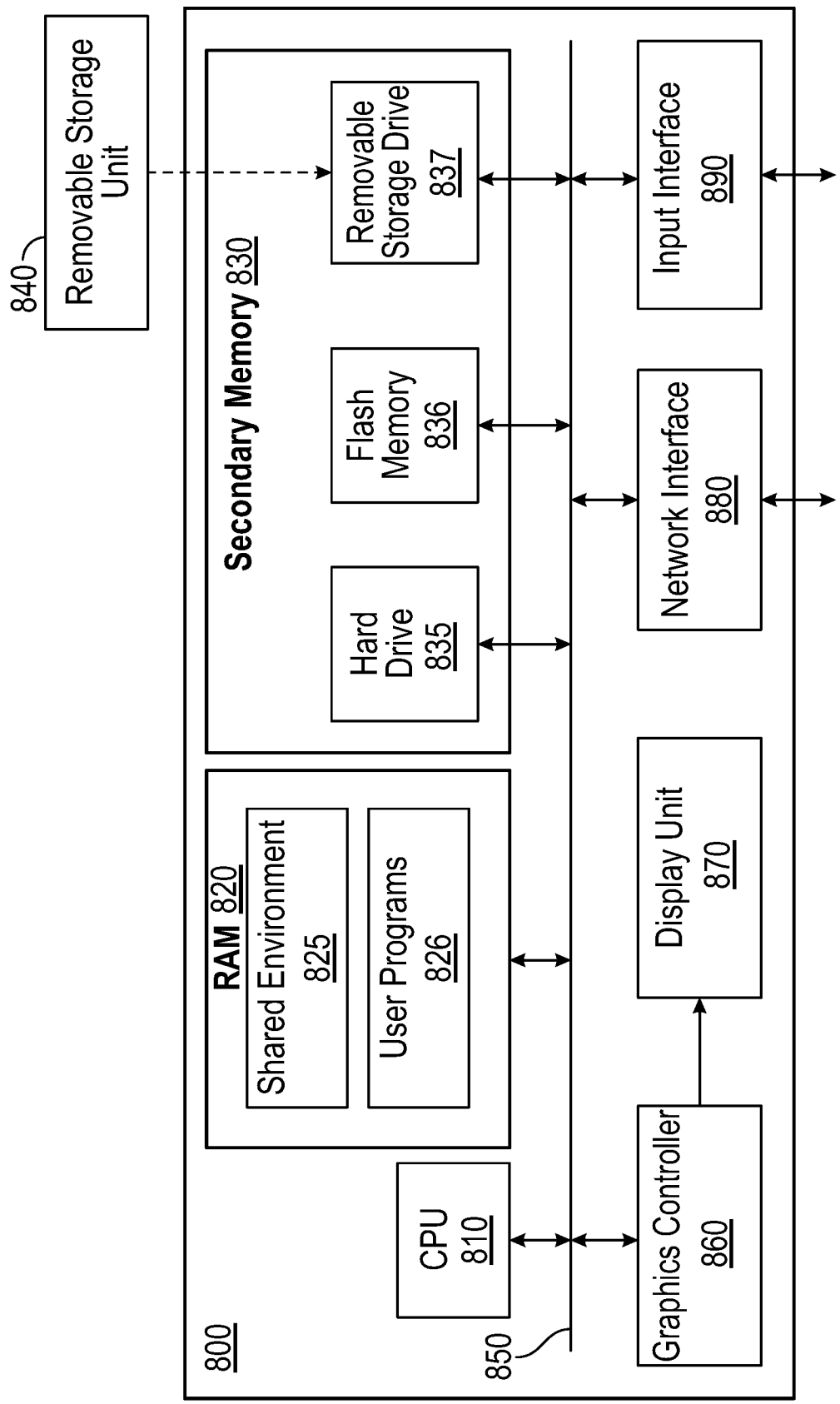
FIG. 8 is a block diagram illustrating the details of digital processing system in which various aspects of the present disclosure are operative by execution of appropriate software instructions.

Referring to FIG. 8, FIG. 8 is a block diagram illustrating the details of digital processing system 800 in which various aspects of the present disclosure are operative by execution of appropriate software instructions. Digital processing system 800 may correspond to first user and second user communication device 102a, 102b . . . 102n and 104a, 104b . . . 104n (or any other system in which the various features disclosed above can be implemented).

Digital processing system 800 may contain one or more processors such as a central processing unit (CPU) 810, random access memory (RAM) 820, secondary memory 827, graphics controller 860, display unit 870, network interface 880, an input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit.

RAM 820 may receive instructions from secondary memory 830 using communication path 850. RAM 820 is shown currently containing software instructions, such as those used in threads and stacks, constituting shared environment 825 and/or user programs 826. Shared environment 825 includes operating systems, device drivers, virtual machines, etc., which provide a (common) run time environment for execution of user programs 826.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse) and may be used to provide inputs. Network interface 880 provides connectivity to a network (e.g., using Internet Protocol), and may be used to communicate with other systems (such as those shown in FIG. 1, network 106) connected to the network.

Secondary memory 830 may contain hard drive 835, flash memory 836, and removable storage drive 837. Secondary memory 830 may store the data software instructions (e.g., for performing the actions noted above with respect to the Figures), which enable digital processing system 800 to provide several features in accordance with the present disclosure.

Some or all of the data and instructions may be provided on the removable storage unit 840, and the data and instructions may be read and provided by removable storage drive 837 to CPU 810. Floppy drive, magnetic tape drive, CD-ROM drive, DVD Drive, Flash memory, a removable memory chip (PCMCIA Card, EEPROM) are examples of such removable storage drive 837.

The removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to the removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A method for monitoring telephony communications in real time, comprising:
    initiating telephony communications towards a first user communication device having the first telephone number from a second user communication device having a second telephone number, whereby the second user communication device and the first user communication device are connected to a first provider communication device and a second provider communication device;
    detecting the telephony communications by a telephony communication establishment module of the second user communication device, matching the telephony communications with the information provided by the telephony communication monitoring system;
    sending the signal to the operating system layer from the telephony communication establishment module of the second user communication device to hang up the telephony communications; and
    sending the signal to the telephony communication monitoring system about the telephony communication result from the telephony communication establishment module of the second user communication device.

2. The method of claim 1, wherein the telephony communication monitoring system invokes the telephony communication establishment module of the first user communication device to trigger a telephony operation towards the second user communication device.

3. The method of claim 2, wherein the telephony communication establishment module of the first user communication device responds back with an acknowledgment signal and denoting whether the telephony operation is triggered, rejected, and successful.

4. The method of claim 2, wherein the first user communication device updates regarding the progress and termination of telephony operation.

5. The method of claim 1, wherein the telephony communication monitoring system notifies origination of the telephony operation to the second user communication device.

6. A computer program product comprising a non-transitory computer-readable medium having a computer-readable program code embodied therein to be executed by one or more processors, said program code including instructions to:
    initiate telephony communications towards a first user communication device having the first telephone number from a second user communication device having a second telephone number, whereby the second user communication device and the first user communication device are connected to a first provider communication device and a second provider communication device;
    detect the telephony communications by a telephony communication establishment module of the second user communication device, match the telephony communications with the information provided by the telephony communication monitoring system;
    send the signal to the operating system layer from the telephony communication establishment module of the second user communication device to hang up the telephony communications; and
    send the signal to the telephony communication monitoring system about the telephony communication result from the telephony communication establishment module of the second user communication device.

7. The computer program product of claim 6, wherein the telephony communication establishment module comprises a listing module configured to list the telephony operations within the communication device.

8. The computer program product of claim 6, wherein the telephony communication establishment module comprises an intercept module configured to intercept the telephony operations.

9. The computer program product of claim 6, wherein the telephony communication establishment module comprises a triggering module configured to trigger the telephony operation towards the communication device having the telephone number.

10. The computer program product of claim 6, wherein the telephony communication establishment module comprises a respond module configured to respond back to the telephone communication monitoring system with data once the telephony operation is terminated.

11. The computer program product of claim 6, wherein the telephony communication establishment module comprises a communication module configured to establish the communication with the computing device and the telephony communication monitoring system.

\* \* \* \* \*